June 5, 1934.     T. A. RICH     1,961,782
ALTERNATING CURRENT DYNAMO ELECTRIC MACHINE
Filed May 26, 1933
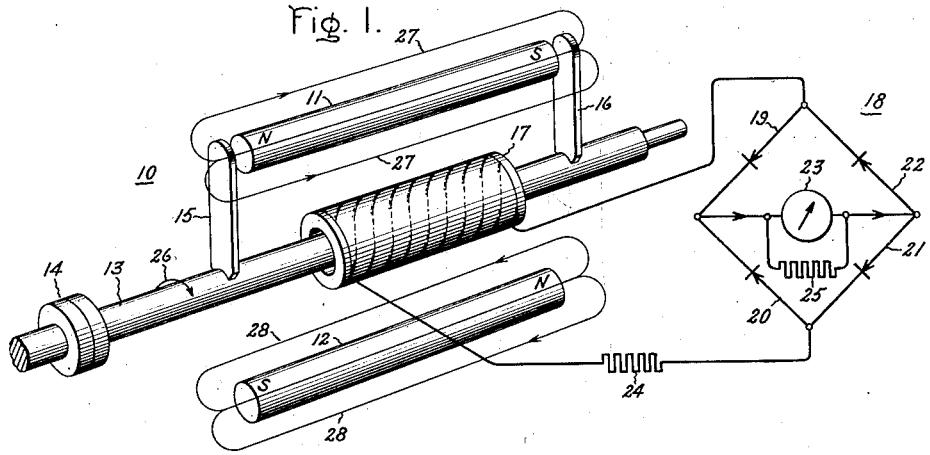
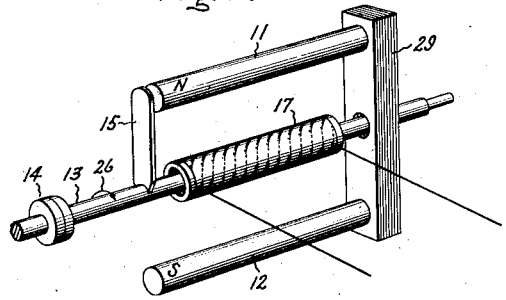
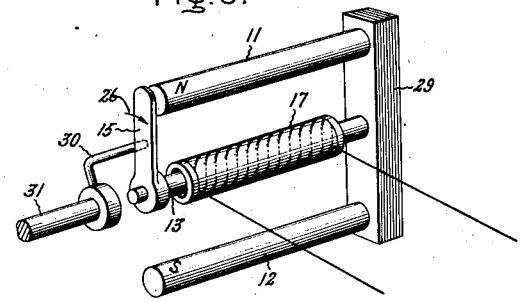
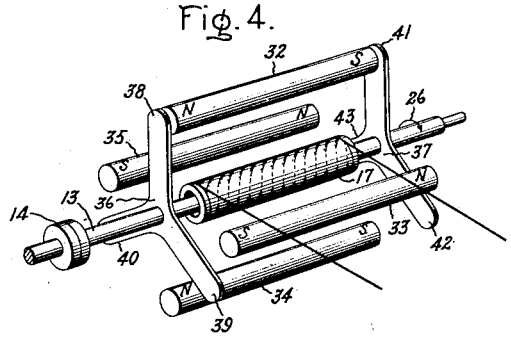
Inventor:
Theodore A. Rich,
by Harry E. Dunham
His Attorney.

Patented June 5, 1934

1,961,782

UNITED STATES PATENT OFFICE 1,961,782

ALTERNATING CURRENT DYNAMO-ELECTRIC MACHINE

Theodore A. Rich, Schenectady, N. Y., assignor to General Electric Company, a corporation of New York Application May 26, 1933, Serial No. 673,062

12 Claims. (Cl. 171—252)

This application is a continuation in part of my copending United States Patent Application Serial No. 464,760, filed June 30, 1930, and assigned to the assignee of the present application. My invention, as disclosed in this patent application, relates to alternating current dynamo-electric machines. More specifically, the main object of this invention is to provide a novel form of alternating current generator.

My invention is especially suitable for use as a tachometer generator on aeroplanes, and will therefore be described in connection with such use; but I wish it clearly understood that it is not limited to such use.

During the operation of aircraft it is important that the pilot should have on his instrument panel an instrument for indicating the engine speed. A mechanically operated speed indicator involves complications, e. g., flexible shafts, hence it is desirable to have an electrically operated speed indicator. One form of electrical speed indicator usually employed consists of a small alternating current generator driven by the aircraft engine, this generator having a permanent magnet, and on the instrument panel there is a voltmeter connected to the armature winding of the generator, the voltmeter scale being calibrated in speed units of the engine. If an alternating current voltmeter is used it is directly connected to the armature winding of the generator, whereas if a direct current voltmeter is employed it is connected in series with a rectifier to the armature winding of the generator. Theoretically considered, the generator voltage should be directly proportional to the engine speed whereby the voltmeter would accurately indicate the engine speed. Practically, however, this is not so, because the strength of the permanent magnet changes with age, vibration, temperature variation, etc., the latter two factors being especially severe when the generator is employed in aeroplanes, and therefore the voltmeter does not accurately indicate the engine speed under different operating conditions or after an extended operating period.

I overcome this disadvantage by providing an alternating current generator of novel construction. Briefly described, my generator comprises two relatively rotatable magnetic structures, one of these structures comprising unidirectional flux-producing means and the other of these structures comprising at least one restricted magnetic section dimensioned to become magnetically saturated with magnetic flux from the flux-producing means, and a coil surrounding at least a portion of one of these magnetic structures, the two magnetic structures being so arranged that their relative rotation causes the coil to be threaded by a pulsating magnetic flux whose maximum value is determined by the cross-sectional area of the restricted magnetic section. The restricted magnetic section is dimensioned to become magnetically saturated at the lowest value of magnetomotive force expected from the flux-producing means, giving proper regard to the expected decrease in its magnetomotive force due to age, vibration, temperature variation, etc. The average value of the alternating voltage delivered by the generator is therefore substantially directly proportional to its speed and therefore to the engine speed. The average voltage impressed on the indicating instrument will thus be substantially directly proportional to the engine speed, hence the voltmeter will accurately indicate the engine speed under different operating conditions, and will continue to do so even after an extended operating period.

My invention however will be best understood from the following description when considered in connection with the accompanying drawing, while those features of my invention which are believed to be novel and patentable are pointed out in the appended claims.

Fig. 1 of the drawing represents a perspective view of one embodiment of my generator, this embodiment employing two stationary permanent magnets and two rotatable restricted magnetic sections. This view also shows the generator armature winding connected in series with a rectifier to a D. C. voltmeter for indicating the speed of the rotating element which drives the generator. Fig. 2 represents a perspective view of the preferred embodiment of my generator employing only one rotatable restricted magnetic section. Fig. 3 represents a modification of Fig. 2, and Fig. 4 represents a perspective view of my generator employing more than two stationary permanent magnets and at least three rotatable restricted magnetic sections. Similar parts in the various figures are represented by the same reference numerals.

In Fig. 1, the generator is represented generally by 10, and comprises two stationary permanent magnets 11 and 12 so arranged that their dissimilar magnetic poles are in the same vertical planes at the two ends of the magnets as shown. The aeroplane engine drives a shaft 13 through any suitable means, such as a coupling 14. The supporting means for magnets 11 and 12, and the bearings for shaft 13, are not shown in the drawing, in order to simplify the latter, this practice also being followed in the other figures. Secured to shaft 13, or integral therewith, are two parallel offset magnetic sections 15 and 16. Section 15 is so arranged that during rotation of shaft 13 the section consecutively sweeps past the N magnetic pole of magnet 11 and the S magnetic pole of magnet 12 with a small air gap between the section and the end of a magnet. Section 16 is so arranged that during rotation of shaft 13 the section consecutively sweeps past the S magnetic pole of magnet 11 and the N magnetic pole of magnet 12 with a small air gap between the section and the end of a magnet. Sections 15 and 16 are also so arranged that during rotation of shaft 13 both sections simultaneously sweep past opposite ends of the same magnet, and, preferably, they are so arranged that at the instant one section is in that position when the reluctance of the air gap between it and the adjacent end of a magnet is at the minimum value, the other section will be in a similar position at the opposite end of the same magnet. Each of sections 15 and 16 is so dimensioned that when it sweeps past the pole of either magnet it will become substantially magnetically saturated at the lowest value of magnetomotive force expected from that magnet, giving due consideration to age, vibration, temperature variation, etc. Preferably, sections 15 and 16 are made of a magnetic material having a high permeability and a sharp knee near the saturation point on its magnetization curve, such a material being, for example, a nickel-iron alloy, known as permalloy, and which is described in United States Patent No. 1,586,883. Magnets 11 and 12 are preferably made of cobalt steel so as to have a high magnetomotive force per unit of length. At least that portion of shaft 13 which is between sections 15 and 16 is made of magnetic material and is preferably dimensioned not to become magnetically saturated during operation of the generator. A stationary coil 17 surrounds a part of shaft 13 situated between sections 15 and 16. Coil 17 is connected to a full wave copper oxide rectifier represented generally by 18 and comprising sections 19, 20, 21 and 22. A direct current instrument 23 is connected to be energized by the rectified current from rectifier 18. A resistance 24 having a zero or a slightly negative temperature coefficient of resistance is connected in series with coil 17 and rectifier 18, and a resistance 25 having similar characteristics is connected across instrument 23.

I will now describe the operation of the above apparatus. Assume that shaft 13 is rotated in the direction shown by arrow 26. When sections 15 and 16 pass the ends of magnet 11, the flux path is as follows: Flux from the N pole of magnet 11 passes across the air gap to section 15, down this section, through shaft 13 from left to right, up through section 16, and across the air gap to the S pole of the magnet. The maximum value of this flux is limited by that necessary to saturate sections 15 and 16. When sections 15 and 16 pass the ends of magnet 12, the flux path is as follows: Flux from the N pole of magnet 12 passes across the air gap to section 16, down this section, through shaft 13 from right to left, up through section 15, and across the air gap to the S pole of the magnet. The maximum value of this flux is also limited by that necessary to saturate sections 15 and 16, and therefore will be substantially equal to the maximum flux value when the sections face the ends of magnet 11. As sections 15 and 16 move away from the ends of either magnet, the magnetic flux passing therethrough and shaft 13 decreases from this maximum value and finally reaches zero value, then starts to pass therethrough in the opposite direction with increasing values until the maximum value is reached when the sections face the ends of the other magnet, after which the described cycle of flux variation is repeated with each revolution of shaft 13. It is clear that rotation of shaft 13 causes that portion of the shaft between sections 15 and 16 to be threaded by an alternating magnetic flux whose maximum value during each alternation is determined by that necessary to saturate these sections, and it is also clear that coil 17 is inductively threaded by this flux. Since the value of magnetic flux necessary to saturate sections 15 and 16 is substantially the same at all speeds of shaft 13, it follows that rotation of shaft 13 causes coil 17 to be inductively threaded by an alternating magnetic flux whose frequency is directly proportional to the shaft speed but whose maximum value is substantially independent of the shaft speed. In addition to the magnetic flux which passes consecutively from each of magnets 11 and 12 through sections 15 and 16 and shaft 13 in the manner above described, each magnet has leakage flux emanating therefrom in all directions. The leakage flux emanating from magnet 11 is, for example, represented by lines 27, and that emanating from magnet 12 is, for example, represented by lines 28. Leakage flux from each magnet tends to pass through that portion of shaft 13 which is surrounded by coil 17, but as this shaft portion is substantially symmetrical with respect to magnets 11 and 12 and the leakage fluxes from these magnets tend to pass in opposite directions through this shaft portion the result is that there is substantially no alternating leakage flux passing through this shaft portion. It follows that substantially the only flux which threads coil 17 inductively so as to induce a voltage therein during rotation of shaft 13 is that which passes through the restricted magnetic sections 15 and 16.

The previously described alternating magnetic flux which inductively threads coil 17 during rotation of shaft 13 induces an alternating voltage in this coil. The average value of this voltage is substantially equal to $4fN\phi^{max}10^{-8}$, where $f$ represents the frequency at which the flux alternates in direction through coil 17, N represents the number of turns of coil 17, and $\phi^{max}$ represents the maximum value of the flux inductively threading coil 17 during rotation of shaft 13. The value of $\phi^{max}$ is substantially constant at all speeds of shaft 13, as previously pointed out, and the value of N is obviously the same at all speeds of this shaft, whereas the value of $f$ is directly proportional to the shaft speed and in the embodiment shown in Fig. 1 is equal to the shaft speed. It follows that the average value of the alternating voltage induced in coil 17 is substantially directly proportional to the speed of shaft 13. Moreover, this relationship holds true even if the magnetomotive force of either or both of magnets 11 and 12 should for any reason be increased or decreased from its initial value, providing, of course, that the magnetomotive force of neither magnet is decreased below the minimum value necessary to produce substantial saturation of sections 15 and 16.

Due to the rectifying action of rectifier 18, the alternating voltage induced in coil 17 causes a unidirectional fluctuating current to flow through instrument 23. The indicating element of this instrument is usually so constructed that it is unable to follow the fluctuations in current value, and it therefore assumes a position depending on the average value of the current flowing through the instrument. By suitably calibrating the scale of instrument 23 in speed units of the aeroplane engine or other device driving shaft 13, the instrument will indicate the speed of the engine or such other device. The use of a direct current instrument is a great advantage because of its sensitivity and uniform scale.

During service, aircraft are subjected to considerable variations in temperature, and as coil 17 and the indicating armature of instrument 23 are usually made of copper, their resistances will decrease with decreased temperature, and vice versa, whereas the copper oxide rectifier 18 increases in resistance with decreased temperature, and vice versa. The change in resistance of rectifier 18 is usually greater than the combined change in resistance of coil 17 and the indicating armature of instrument 23, hence if some kind of compensation is not provided for, the instrument will read low with decreasing temperature and high with increasing temperature. This however is practically prevented by the use of resistances 24 and 25 each having a zero or a slightly negative temperature coefficient of resistance. The ohmic value of resistance 24 is several times the combined ohmic resistance of coil 17, rectifier 18, and instrument 23, hence the per cent change in resistance of the entire circuit will be very small under the above mentioned temperature variations. Furthermore, due to resistance 25, a decreasing temperature causes a larger portion of the current from rectifier 18 to flow through instrument 23 and an increasing temperature causes a smaller portion of this current to flow through the instrument. If suitable values of resistances 24 and 25 are employed, the average value of the current flowing through the instrument will be practically independent of those variations in temperature to which the aeroplane is subjected, hence the instrument will accurately indicate the engine speed under different temperature conditions.

The generator shown in Fig. 2 is similar to that shown in Fig. 1, except that the restricted magnetic section 16 has been omitted and a stationary stack of laminations 29 of magnetic material is either secured to or otherwise tightly pressed against the right-hand end of magnets 11 and 12 so as to make good magnetic contact therewith. Magnets 11 and 12 and laminations 29 therefore now constitute a single magnetic structure having only the two free magnetic poles shown. A hole is provided in laminations 29, and shaft 61 extends through this hole with a very small air gap between the shaft and the laminations. Laminations 29 are so dimensioned that no part thereof becomes saturated during operation of the generator. When section 15 faces the free end of magnet 11 the flux path is as follows: Flux from the N pole of this magnet passes across the air gap, down through this section, through shaft 13 from left to right, across the air gap to laminations 29, up through the laminations to that end of magnet 11 in contact with the laminations, and back through this magnet. When section 15 faces the free end of magnet 12 the flux path is as follows: Flux from that end of magnet 12 which is in contact with laminations 29 passes up through these laminations across the air gap into shaft 13, through this shaft from right to left, down through section 15, across the air gap to the S pole of magnet 12, and back through this magnet. From this description and that given in connection with Fig. 1, it should be clear that rotation of section 15 will cause coil 17 to be threaded by an alternating magnetic flux whose maximum value is that necessary to saturate this section, and that the average value of the alternating voltage induced in this coil will be substantially directly proportional to the speed of shaft 13.

The generator shown in Fig. 3 is similar to that shown in Fig. 2, except that no hole is provided in laminations 29 for shaft 13 to pass through, this shaft being stationary in Fig. 3 with its right-hand end either secured to or otherwise tightly pressed against the laminations so as to make good magnetic contact therewith. Section 15, however, is rotatably mounted on shaft 13 and is so arranged that it is incapable of having any substantial longitudinal movement on the shaft, and will, when revolved, consecutively pass the free ends of magnets 11 and 12 with a small air gap between the section and the end of the magnet it is passing. Section 15 is revolved by a bent arm 30 extending from and secured to a shaft 31 which is driven by the device whose speed is to be measured. This generator operates in the manner described in connection with the generator shown in Fig. 2, hence it should be clear that the average value of the alternating voltage induced in coil 17 in Fig. 3 will be substantially directly proportional to the speed of shaft 31.

The generator shown in Fig. 4 is similar to the one shown in Fig. 1, except that four equally spaced stationary magnets 32, 33, 34 and 35 are symmetrically positioned with respect to shaft 13. These magnets are preferably made of cobalt steel and are so arranged that their right-hand ends are in the same vertical plane with opposite magnetic poles following each other in consecutive order in this plane, and the same is true of their left-hand ends. Also, two similar magnetic sections 36 and 37, preferably made out of the same material as sections 15 and 16 in Fig. 1, are secured to shaft 13. Section 36 consists of three equally spaced ears 38, 39 and 40, whereas section 37 consists of three equally spaced ears 41, 42 and 43, all the ears being so dimensioned that whenever an ear faces the end of a magnet it will become substantially magnetically saturated at the lowest value of magnetomotive force expected from the magnet, giving due consideration to age, vibration, temperature variation, etc. Section 36 is secured to shaft 13 so that its ears will revolve past the left-hand ends of the magnets, and section 37 is secured to this shaft so that its ears will revolve past the right-hand ends of the magnets, the sections being so secured to the shaft that the ears of one section are parallel to and in line with the ears of the other section. Assume that shaft 13 is driven in the direction shown by arrow 26. From the description given in connection with the generator shown in Fig. 1, it will be clear that when ears 38 and 41 in Fig. 4 are passing the ends of magnet 32 a magnetic flux from this magnet passes through these ears and through shaft 13 from left to right, the maximum value of this flux being determined by that necessary to saturate these ears. When sections 36 and 37 have rotated 30 mechanical degrees from the illustrated position, ears 40 and 43 face the ends of magnet 35 and a magnetic flux from this magnet passes through these ears and through shaft 13 from right to left. When sections 36 and 37 have rotated 30 more mechanical degrees ears 39 and 42 face the ends of magnet 34 and a magnetic flux from this magnet passes through these ears and through shaft 13 from left to right. From this it is clear that further rotation of sections 36 and 37 causes the flux passing through that portion of shaft 13 which is surrounded by coil 17 to reverse in direction every time the sections have advanced 30 mechanical degrees, hence the coil is threaded by an alternating magnetic flux whose maximum value is determined by that necessary to saturate the ears of the sections. It should therefore be clear that the average value of the alternating voltage induced in coil 17 is substantially directly proportional to the speed of shaft 13. It should also be clear that there are six complete reversals of the flux threading coil 17 for each revolution of shaft 13, thus giving six cycles of the alternating voltage per revolution of the shaft. As compared to the generators shown in Figs. 1, 2 and 3, which give only one cycle of alternating voltage per revolution of their shaft, the generator shown in Fig. 4 has constructional advantages well known to those skilled in the art, because of its higher frequency per revolution of its shaft.

Another important advantage of my generator is the fact that its rotatable member can be made small and light, thus requiring a small amount of power to start it and to drive it. My generator can therefore be used for accurately measuring the speed of a rotating device which possesses a small amount of driving power, since my generator will not put sufficient load on this device to reduce its speed appreciably.

In accordance with the provisions of the patent statutes, I have described the principles of operation of my invention, together with the apparatus which I now consider to represent the best embodiments thereof; but I desire to have it understood that the apparatus shown and described is only illustrative and that the invention may be carried out by other means.

What I claim as new and desire to secure by Letters Patent of the United States is:

1. An alternating current dynamo-electric machine comprising two relatively rotatable magnetic structures, one of said structures comprising unidirectional flux-producing means, and the other of said structures comprising at least one restricted magnetic section dimensioned to become substantially saturated with magnetic flux from said flux-producing means, and a coil surrounding at least a portion of one of said magnetic structures, said two magnetic structures being so arranged that their relative rotation causes said coil to be threaded by a pulsating magnetic flux whose maximum value is determined by the cross-sectional area of said restricted magnetic section.

2. An alternating current dynamo-electric machine comprising two relatively rotatable magnetic structures, one of said structures comprising unidirectional flux-producing means adapted to present at least two magnetic poles of opposite polarities in the same plane, and the other of said structures comprising at least one restricted magnetic section located in a plane which is adjacent to that in which said magnetic poles are located, said magnetic section being dimensioned to become substantially saturated with magnetic flux from said flux-producing means, and a coil surrounding at least a portion of one of said magnetic structures, said two magnetic structures being so arranged that their relative rotation causes the coil to be threaded by an alternating magnetic flux whose maximum value is determined by the cross-sectional area of said restricted magnetic section.

3. An alternating current dynamo-electric machine comprising two relatively movable magnetic structures, one of said structures comprising means for producing a unidirectional magnetomotive force, and the other of said structures comprising at least one restricted magnetic section dimensioned to become substantially saturated with magnetic flux from said magnetomotive force-producing means, and a coil surrounding at least a portion of one of said magnetic structures, said two magnetic structures being so arranged that their relative motion causes said coil to be threaded by a pulsating magnetic flux whose maximum value is determined by the cross-sectional area of said restricted magnetic section.

4. An alternating current dynamo-electric machine comprising at least three elements, one of said elements consisting of unidirectional flux-producing means, a second of said elements consisting of a restricted magnetic section dimensioned to become substantially saturated with magnetic flux from said flux-producing means, and the third of said elements consisting of a magnetic structure arranged magnetically in series with said flux-producing means and said restricted magnetic section, said flux-producing means and said restricted magnetic section being relatively rotatable and being so arranged that their relative rotation causes said three elements to be threaded by a pulsating magnetic flux whose maximum value is determined by the cross-sectional area of the restricted magnetic section, and a coil surrounding at least a portion of one of said elements.

5. An alternating current dynamo-electric machine comprising a magnetic core, a coil surrounding at least a portion of said core, two relatively rotatable magnetic structures, one of said structures comprising unidirectional flux-producing means, and the other of said structures comprising at least one restricted magnetic section dimensioned to become substantially saturated with magnetic flux from said flux-producing means, said core and magnetic structures being so arranged that the relative rotation of the two magnetic structures causes the restricted magnetic section and the core to be threaded by a pulsating magnetic flux whose maximum value is determined by the cross-sectional area of the restricted magnetic section.

6. An alternating current dynamo-electric machine comprising a magnetic field system consisting of at least one stationary magnet for producing a unidirectional magnetomotive force and a rotatable magnetic structure to function as a magnetic circuit for the magnetic flux from said magnet, said magnetic structure having at least one restricted magnetic section which is arranged to revolve past at least one of the magnetic poles of said magnet and which is dimensioned to become substantially saturated when facing a magnetic pole of said magnet, said stationary magnet and rotatable magnetic structure being so arranged that the rotation of said restricted magnetic section causes said magnetic field system to be threaded by a pulsating magnetic flux whose maximum value is determined by the cross-sectional area of the restricted magnetic section, and a coil surrounding at least a portion of said magnetic field system.

7. An alternating current dynamo-electric machine comprising a stationary magnet for producing a unidirectional magnetomotive force, a rotatable magnetic core having at least one restricted magnetic section arranged to revolve past at least one of the magnetic poles of said magnet, said core with its restricted magnetic section being arranged to function as a magnetic circuit for said magnet, said restricted magnetic section being dimensioned to become substantially saturated when facing a magnetic pole of said magnet, and being so arranged that its rotation past the magnet causes said core to be threaded by a pulsating magnetic flux whose maximum value is determined by the cross-sectional area of the restricted section, and a coil surrounding at least a portion of said core.

8. An alternating current dynamo-electric machine comprising stationary unidirectional flux-producing means adapted to present at least two magnetic poles of opposite polarities in the same plane, a rotatable magnetic core having at least one restricted magnetic section which is arranged to revolve past the magnetic poles of said flux-producing means and which is dimensioned to become substantially saturated when facing a magnetic pole of said flux-producing means, said core and its restricted magnetic section being so arranged that their rotation causes them to be threaded by an alternating magnetic flux whose maximum value is determined by the cross-sectional area of the restricted magnetic section, and a coil surrounding at least a portion of said core.

9. An alternating current dynamo-electric machine comprising an even number of stationary longitudinally extending magnets each adapted to produce a unidirectional magnetomotive force, said magnets being arranged to present opposite magnetic polarities in consecutive order at each end of the magnets, a rotatable magnetic shaft, an odd number of restricted magnetic sections secured to said shaft so as to revolve by and adjacent the magnetic poles of said magnets at one end thereof, an odd number of restricted magnetic sections secured to said shaft so as to revolve by and adjacent the magnetic poles of said magnets at the opposite end thereof, said restricted sections being so secured to said shaft that both poles of one magnet after another in consecutive order are simultaneously faced by two of said restricted sections during rotation of said shaft, each of said restricted sections being dimensioned to become substantially saturated when it faces the magnetic pole of a magnet, and a coil surrounding at least a portion of said shaft intermediate the restricted magnetic sections secured thereto.

10. An alternating current dynamo-electric machine comprising two stationary longitudinally extending magnets each adapted to produce a unidirectional magneto-motive force, said magnets being arranged to present opposite magnetic polarities in the same plane, a rotatable magnetic shaft, a restricted magnetic section secured to said shaft so as to revolve by and adjacent the magnetic poles of said magnets at one end thereof, another restricted magnetic section secured to said shaft so as to revolve by and adjacent the magnetic poles at the opposite end thereof, said restricted magnetic sections being so secured to said shaft that they simultaneously face both poles of one magnet after another during rotation of said shaft, each of said restricted magnetic sections being dimensioned to become substantially saturated when it faces the magnetic pole of a magnet, and a coil surrounding at least a portion of said shaft intermediate the two restricted magnetic sections secured thereto.

11. An alternating current dynamo-electric machine comprising a plurality of stationary longitudinally extending magnets each adapted to provide a unidirectional magnetomotive force, said magnets being arranged to present opposite magnetic polarities in consecutive order at each end of the magnets, a rotatable magnetic core between said magnets, at least one restricted magnetic section secured to said core so as to revolve by and adjacent the magnetic poles of said magnets at one end thereof, a stationary magnetic structure in magnetic contact with the other end of said magnets, said restricted magnetic section being dimensioned to become substantially saturated when facing the magnetic pole of a magnet, the magnets, magnetic structure and the core with its restricted magnetic section being so arranged that the rotation of the latter causes the core to be threaded by an alternating magnetic flux whose maximum value is determined by the cross-sectional area of the restricted section, and a coil surrounding at least a portion of said core.

12. An alternating current dynamo-electric machine comprising a plurality of stationary longitudinally extending magnets each adapted to produce a unidirectional magnetomotive force, said magnets being arranged to present opposite magnetic polarities in consecutive order at each end of the magnets, a stationary longitudinally extending magnetic core between said magnets, a stationary magnetic structure in magnetic contact with the magnetic poles at one end of said magnets and the corresponding end of said core, at least one restricted magnetic section rotatably mounted near the other end of said core so as to revolve by and adjacent the magnetic poles at the other ends of said magnets, said restricted magnetic section being dimensioned to become substantially saturated when it faces the magnetic pole of a magnet, the magnets, magnetic structure, core and restricted magnetic section being so arranged that rotation of the latter causes the core to be threaded by an alternating magnetic flux whose maximum value is determined by the cross-sectional area of the restricted section, and a stationary coil surrounding at least a portion of said core.

THEODORE A. RICH.